United States Patent [19]
Brenneisen et al.

[11] 3,916,287

[45] Oct. 28, 1975

[54] OVERLOAD PROTECTION FOR A DC TO AC CONVERSION APPARATUS INCLUDING AN N-PHASE INVERTER

[75] Inventors: Jorg Brenneisen, Mannheim-Neckarau; Ehrhard Futterlieb, Mannheim-Feudenheim, both of Germany

[73] Assignee: Brown, Boveri & Cie Aktiengesellschaft, Mannheim, Germany

[22] Filed: Mar. 25, 1974

[21] Appl. No.: 454,547

[52] U.S. Cl................ 321/12; 317/33 SC; 317/46; 321/5; 321/14
[51] Int. Cl.²................................ H02H 7/122
[58] Field of Search.................. 321/5, 11–14, 321/45 C; 317/33 R, 33 SC, 46

[56] References Cited
UNITED STATES PATENTS

| | | | |
|---|---|---|---|
| 3,321,697 | 5/1967 | Etter | 321/45 C |
| 3,569,819 | 3/1971 | Martzloff et al. | 321/14 X |
| 3,611,108 | 10/1971 | Susumu et al. | 321/11 |
| 3,683,264 | 8/1972 | Schieman et al. | 321/5 X |

*Primary Examiner*—Gerald Goldberg
*Attorney, Agent, or Firm*—Toren, McGeady and Stanger

[57] ABSTRACT

A thyristor inverter having N parallel branches is controlled by an impulse supply source which normally excites the individual thyristors in each branch in cyclic succession. In the presence of an overload in a branch, the impulse source is switched to an override mode which simultaneously excites all of the inverter thyristors. A coil disposed in each of the inverter branches defines, with a reactive circuit including a storage capacitor connected across the branches, an oscillatory circuit. The inductance of the branch coils is chosen such that during the override mode, the oscillatory current is larger in magnitude than the overload current. The inverter thyristors are thus extinguished during the half-cycle of oscillation in which the polarity of the oscillation opposes that of the overload current. After such quench, the impulse source may either be disabled to prevent re-ignition of the thyristors, or switched back to its normal mode.

13 Claims, 4 Drawing Figures

3,916,287

OVERLOAD PROTECTION FOR A DC TO AC CONVERSION APPARATUS INCLUDING AN N-PHASE INVERTER

BACKGROUND OF THE INVENTION

One conventional type of DC to AC converting apparatus employs an N-phase output generated by an inverter having N parallel branches, wherein each branch contains at least one controllable thyristor gate. Operating bias for the branches is provided by a DC source via a reactive circuit including a storage capacitor coupled across the branches. This type of converting apparatus may define a portion of a single-phase to N-phase AC converter having an intermediate DC stage.

In known arrangements of this type involving a 3-phase inverter, an impulse supply source is coupled to the control electrodes of the thyristor gates in the three inverter branches. In a first normal mode of operation, the impulse source sequentially ignites and quenches the gates in the successive branches at a predetermined frequency in such a manner that the intervals of conduction of the successive branches overlap to form a three-phase AC output.

In the event of a short circuit in the branch of an inverter (cause, e.g. by shoot through in the associated thyristor gate), the relatively large storage capacitor will be discharged through the affected inverter branch. Since the resulting discharge current will be continually replenished by the DC source, the continuing short circuit current flow through the branch will maintain the affected thyristors in the "on" state so that the latter will no longer be subject to the control of the impulse source. As a result, such thyristors will be exposed to dangerous thermal effects.

In order to partially protect the conversion apparatus from current overloads of this type, the impulse source may be made selectively operable in a second or override mode, whereby upon the detection of the occurrence of a current overload in an inverter branch the impulse source will excite the control electrodes of all the thyristors simultaneously. This action will provide several shunting paths across the affected branch to draw off some of the excessive load current therefrom.

Even with this improvement, however, there still remains the problem of quenching all the now-conductive thyristor gates of the inverter to effect the disabling of the apparatus for repairing the defect. It is impractical to directly connect fuses or mechanical safety switches in the inverter branches themselves, since the operation of such cut-out devices would be unreliable because of their subjection to the high-frequency switching transients through the thyristor gates during normal operation. Moreover, while it is possible to disable the conversion apparatus during overload conditions by opening the switch normally provided between the DC source and the inverter, this would require interruption of the full short circuit current by the switch, leading to pitting and burning of its contacts and a shortening of its useful life.

SUMMARY OF THE INVENTION

An improved protection arrangement which avoids these disadvantages by assuring rapid and reliable quenching of the inverter gates upon the occurrence of a short circuit condition is provided by the present invention. In an illustrative embodiment, the inductance of the surge-limiting coils disposed in the respective branches of the inverter are selected, in cooperation with the reactive circuit, to form an oscillatory network whose current components through each branch, when the thyristors are simultaneously made conductive by the impulse source have a period long relative to the normal conduction time of each thyristor and an amplitude larger than the maximum short circuit current through each branch under overload conditions. With this arrangement, during the particular half-cycle of the oscillating current when the latter is in phase opposition to the short circuit current, the thyristors are automatically quenched without the necessity of opening, under load, the switch between the DC source and the inverter.

Once quench occurs, the impulse source may be disabled to prevent any further excitation of the control electrodes of the thyristors, or alternatively may be switched back to its normal sequential mode. Facilities may also be provided which are operable after quench for automatically opening the switch between the DC source and the inverter.

The overload current detectors in the inverter branches may be coupled to a comparator, which excites a mode switching input of the impulse source to establish the override mode. If desired, suitable logic means may also be coupled to the comparator for uniquely indicating the branch affected by the overload.

BRIEF DESCRIPTION OF THE DRAWING

The invention is further set forth in the following detailed description taken in conjunction with the appended drawing, in which.

DETAILED DESCRIPTION

Figure 1:
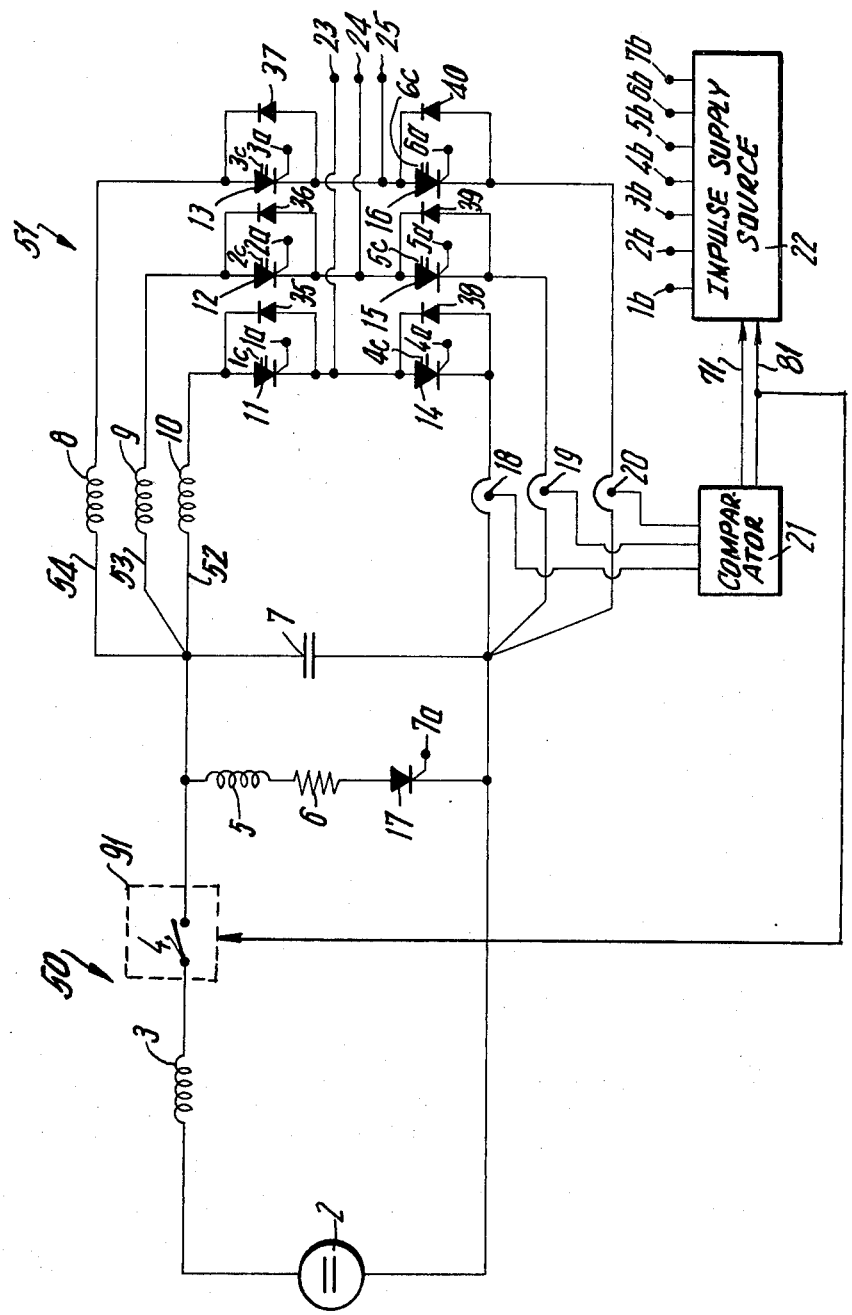
FIG. 1 is a combined block and schematic diagram of one form of DC to AC conversion apparatus including a 3-phase inverter and having overload-responsive protection facilities in accordance with the invention.

Referring now to FIG. 1, a DC to AC conversion apparatus 50 includes an input DC source 2 coupled through a smoothing choke 3 and a switch 4 to a three-phase inverter 51. The inverter is formed from three parallel, thyristor-controlled branches 52, 53 and 54.

The branch 52 includes, in series, a surge-limiting coil 10, a pair of thyristors 11 and 14 disposed in series-aiding relation and respectively shunted by a pair of oppositely poled diodes 35 and 38, and a current detector 18. In like manner, the branch 53 includes a coil 9, a pair of thyristors 12 and 15 respectively shunted by oppositely poled diodes 36 and 39, and a current detector 19. The branch 54 includes a coil 8, a pair of thyristors 13 and 16 respectively shunted by a pair of oppositely poled diodes 37 and 40, and a current detector 20.

The three-phase output of the inverter 51 is tapped off on lines 23, 24 and 25 from the junctions between the thyristors 11 and 14, 12 and 15, and 13 and 16 respectively.

Operating bias for the thyristors 11–16 in the inverter 51 is stored across a capacitor 7 which is connected in shunt with the branches 52–54. The capacitor 7 is maintained charged by DC source 2 when the switch 4 is closed. An additional shunting path represented by the series combination of a coil 5, a resistor 6, and a thyristor 17 is also coupled across the capacitor 7.

The detectors 18, 19, and 20 are each coupled to a comparator 21. The comparator yields an indication on a first output line 71 whenever any of the branches 52–54 exhibits a current overload condition. (Such condition, which may be caused, e.g., by shoot through of the thyristors in the affected branch, yields an effective short across capacitor 7). The line 71 is coupled to a mode switching input of an impulse supply source 22.

The source 22 normally operates in a first mode to supply, via outputs $1b$, $2b$–$6b$ sequential turn-on pulses at a predetermined frequency to control electrodes $1a$ and $4a$, $2a$ and $5a$, and $3a$ and $6a$ associated with the thyristor pairs 11 and 14, 12 and 15, and 13 and 16 respectively. The source 22 is also provided with conventional means (not shown) for successively supplying to quenching inputs $1c$ and $4c$, $2c$ and $5c$, and $3c$ and $6c$ of the respective thyristor pairs 11 and 14, 12 and 15, and 13 and 16, extinction pulses a predetermined time after the application of the turn-on pulses to the associated control electrodes, thereby establishing the conducting interval of the thyristors.

When one of the detectors 18–20 detects an overload condition in the associated inverter branch, the resulting indication generated by comparator 21 on the line 71 effects the switching of the impulse source 22 from the normal to an override mode. In this latter mode, the cyclic progression of the turn-on pulses at the outputs $1b$–$6b$ of the source 22 is terminated, and the source 22 applies turn-on pulses simultaneously to the control electrodes of all of the thyristors 11–16 of the inverter. In addition, a turn-on pulse is applied at the same time to the thyristor 17 via an auxiliary output $7b$ of the source 22. As a result, the overloaded branch of the inverter is instantaneously bridged by three other conductive paths to draw off a portion of the excessive load current.

Since such overload current is in the forward direction of all the thyristors 11–16 and is constantly replenished by the DC source 2, such thyristors ordinarily remain conductive. In accordance with the invention, a technique for rapidly and automatically quenching the thyristors is provided without the necessity of opening the switch 4 under full load. Such technique employs an oscillatory circuit formed from the coils 8, 9, and 10 in the thyristor branches in combination with the supply capacitor 7 and the reactances 3 and 5. The inductance of the coils 8–10 are chosen such that when all of the thyristors 11–16 are turned on simultaneously by the impulse source 22 in its override mode, the resultant oscillatory current exhibits (1) a period at least twice as long as the maximum conductive interval of the thyristors 11–16 during normal operation, and (2) an amplitude larger than the short circuit current through the branches 52–54. Under these circumstances, during the half-cycle of the oscillatory current in which the polarity of the latter opposes that of the overload current through the inverter branches, the inverter thyristors are effectively quenched.

The impulse source 22 is preferably arranged to be disabled upon quench. This may be accomplished e.g., in response to a separate indication generated by the comparator 21 on an output line 81 when each of the detectors 18–20 registers the zero current condition indicative of quench. When the source 22 is disabled, no further turn-on pulses will be applied to the control electrodes $1a$–$6a$ of the thyristors 11–16, and the inverter will remain off. Alternatively, since after the occurrence of quench the capacitor 7 will be charged up again to normal operating voltage through the still-closed switch 4, the inverter will again be conditioned for operation. Consequently, if desired, the impulse source 22 may be arranged to be switched back into its normal mode upon the occurrence of quench (i.e., in response to an output on the line 81) to again apply a sequence of turn-on pulses to the control electrodes $1a$–$6a$.

In the case where the source 22 is disabled upon quench, zero current will flow from the DC source 2 after the capacitor 7 has been recharged. Under these conditions, the switch 4 will pass no current and may therefore be safely opened without danger of pitting or burning of its contacts, thereby greatly prolonging its life. If the switch 4 is provided with a disabling input, 91 as shown, the latter may be excited by the output on the line 81 upon the occurrence of quench.

Figure 2:
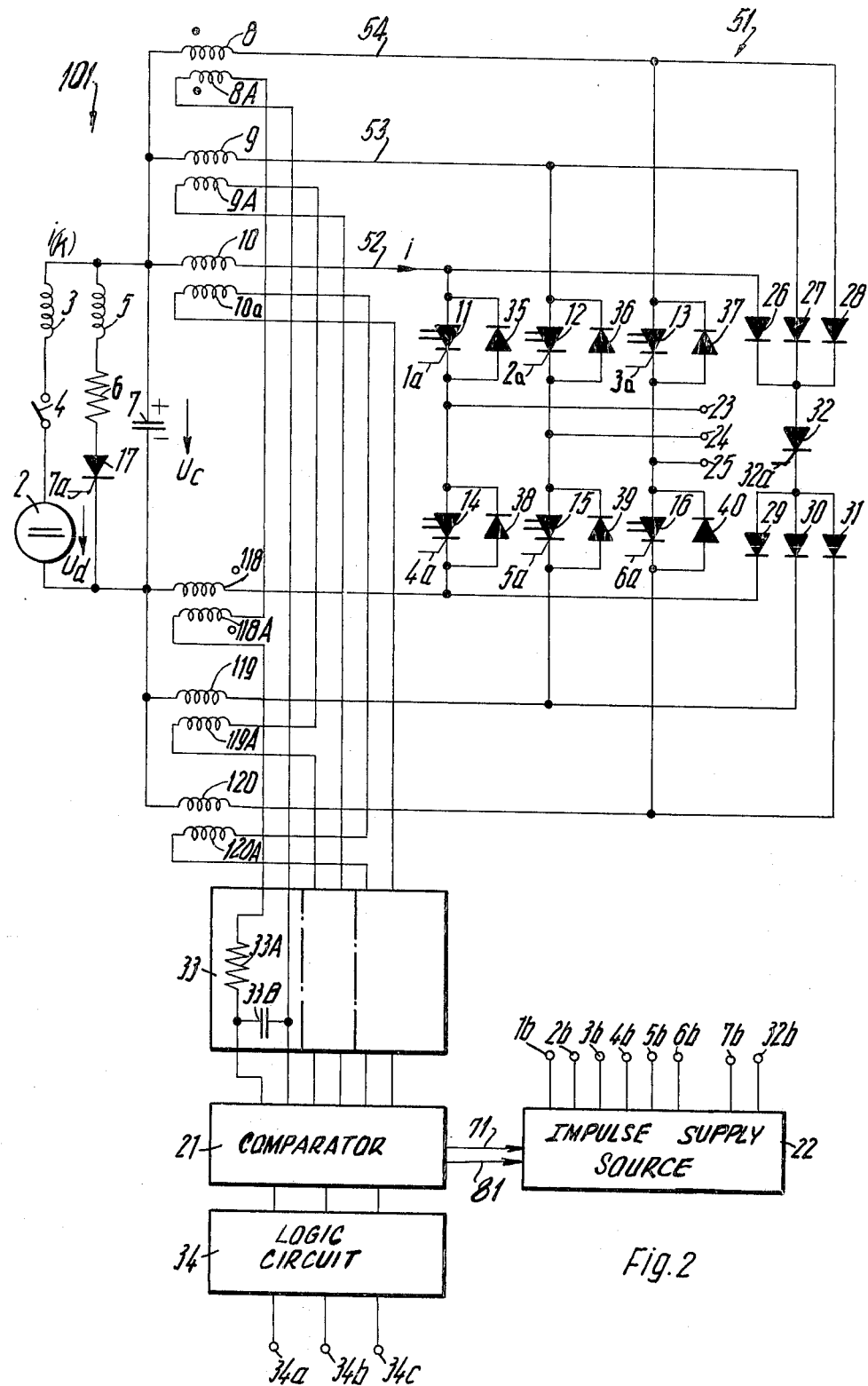
FIG. 2 is a combined block and schematic diagram of another form of DC to AC conversion apparatus, showing details of one suitable type of overload detection arrangement.

FIG. 2 shows in detail a DC to AC conversion apparatus 101 similar in principle to that of FIG. 1 but including additional elements. Corresponding elements in FIGS. 1 and 2 have been given corresponding reference numerals.

In FIG. 2, the branch 52 has an additional coil 118 connected in series-aiding relation to the surge coil 10. Similarly, the branch 53 has an additional coil 119 connected in series-aiding relation with the coil 9 and the branch 54 has an additional coil 120 connected in series-aiding relation with the coil 8.

The current detection facilities in the branch 52 includes a pair of series-aiding auxiliary coils 10A and 118A magnetically coupled to the coils 10 and 118, respectively. Corresponding detection facilities in the branch 53 include a pair of series-aiding auxiliary coils 9A and 119A magnetically coupled to the coils 9 and 119, respectively. The relevant facilities in the branch 54 and a pair of series aiding auxiliary coils 8A and 120A magnetically coupled to the coils 10 and 120, respectively.

Each of the auxiliary coil series 10A and 118A, 9A and 119A, and 8A and 120A are coupled to an associated R-C integrating circuit 33, only one of which is illustrated. The output of each such integrating circuit is coupled to the comparator 21.

As in FIG. 1, the output of the comparator 21 in FIG. 2 is coupled to the impulse source 22 via lines 71 and 81. In addition, comparator 21 is coupled to a logic circuit 34, having separately excitable output lines 34a, 34b, and 34c individually associated with the branches 52, 53, and 54. In a conventional manner, the logic circuit provides, during a current overload condition in the invester, an indication of the branch in which the current overload occurs.

Each pair of thyristors 11 and 14, 12 and 15, and 13 and 16 in FIG. 2 are shunted by a path including a common thyristor 32. The control electrode $32a$ of the thyristor 32 is excited by an auxiliary output $32b$ of the impulse source 22 when the latter is operated in the override mode. The thyristor 32 is coupled across the thyristors 11 and 14 via series-aiding diodes 26 and 29. Additionally, the thyristor 32 is coupled across the thyristors 12 and 14 via series-aiding diodes 27 and 30, and across the thyristors 13 and 16 via series-aiding diodes 28 and 31. The thyristor 32 and each pair of the coupling diodes thereby provide, for the associated branch, an additional bypass for the inverter thyristors when the latter are shorted.

Figure 3A:
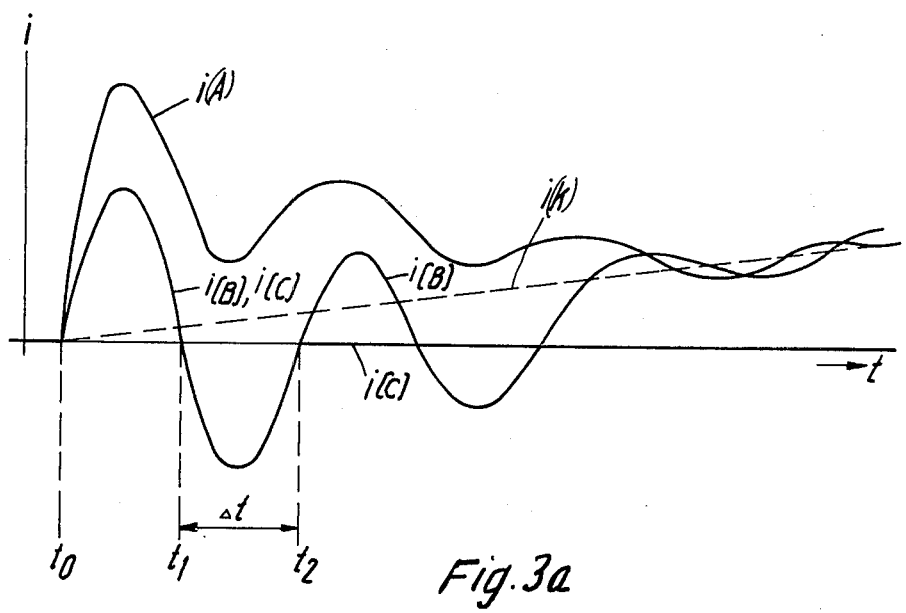
FIG. 3a is a set of curves showing a comparison of current courses in various portions of the arrangement of FIG. 1 or FIG. 2 during overload.

The various currents established in the converting apparatus 50 or 101, including the oscillatory current established in the override mode, are shown in FIG. 3a. (The override mode is assumed to start at $t = to$). The current $i(A)$ represents the cause of the overload current through the affected inverter thyristors. As noted above, this current does not change polarity and the thyristors accordingly cannot be quenched without external measures.

The course $i(B)$ represents the oscillatory components established in accordance with the invention in the override mode, in the case where the normal mode of the source 22 is restored after quench, so that the thyristors are periodically reignited. The course $i(K)$ represents the current through DC source 2. During the half-period $t2-t1$ of the oscillatory current $i(B)$, its polarity is opposite to that of the load current $i(A)$ and its magnitude is larger than the sum of the currents $i(K)$ and $i(A)$; consequently, the thyristors will be quenched.

In the event that the source 22 is disabled after quench, re-ignition of the thyristors is prevented and the resulting oscillatory current component through the thyristor branches is represented by $i(C)$ rather than $i(B)$. Such current $i(C)$ will be zero after $t = t2$.

Figure 3B:
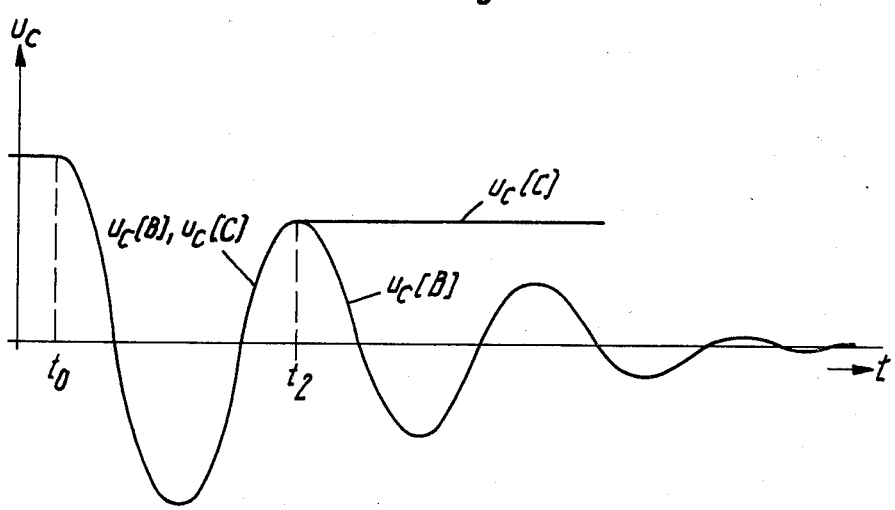
FIG. 3b is a set of curves illustrating the voltage course across the storage capacitor of the reactive circuit of FIG. 1 or FIG. 2 during overload.

The voltage on the capacitor 7 corresponding to the current conditions of FIG. 3a is shown in FIG. 3b. The voltage courses $u_c(B)$ and $u_c(C)$ represent the oscillatory swings corresponding to the currents $i(B)$ and $i(C)$, respectively, in FIG. 3a. After $t = t2$ the course $u_c(C)$ no longer coincides with $u_c(B)$, but represents the voltage to which the capacitor 7 is charged by the DC source 2 when re-ignition of the inverter thyristors is prevented.

In the foregoing, the invention has been described in connection with preferred arrangements thereof. Many variations and modifications will now occur to those skilled in the art. For example, a silicon controlled rectifier or other thyratron-like switching element may be substituted, if desired, for each of the various thyristors of the converting apparatus 50 and 101. It is accordingly desired that the scope of the appended claims not be limited to the specific disclosure herein contained.

What is claimed is:

1. In a DC to AC conversion apparatus comprising an inverter having N parallel branches coupled to a DC source and respectively including a thyratron-like switching element, a reactive circuit including a storage capacitor connected across the branches, and impulse supply means operable in a first mode at a predetermined frequency for sequentially rendering the switching elements of the successive branches conductive for a prescribed interval to provide an N-phase AC inverter output and further operable in a second mode in response to an overload current in one of the branches for rendering all the switching elements simultaneously conductive, at least one main coil disposed in each branch to define, with the reactive circuit, a network oscillatory only in the second mode, the inductance of the main coil being chosen such that the resultant oscillatory current exhibits during the second mode a period long with respect to the normal maximum conductive interval of each switching element and a magnitude greater than the maximum overload current.

2. The apparatus as defined in claim 1, further comprising, means for selectively disabling the impulse supply means.

3. The apparatus as defined in claim 1, in which each switching element is a thyristor.

4. The apparatus as defined in claim 1, further comprising a normally closed auxiliary switch disposed between the DC source and the inverter, and means rendered effective after the impulse supply means has been switched into the second mode for opening the auxiliary switch.

5. The apparatus as defined in claim 1, further comprising means for selectively switching the impulse supply means from the second mode to the first mode.

6. The apparatus as defined in claim 1, further comprising a plurality of diodes individually connected across the switching elements with opposite polarity thereto.

7. The apparatus as defined in claim 1, further comprising, in combination, an additional thyratron-like switching element, and means for connecting the additional switching element in parallel with all all of the branches of the inverter.

8. The apparatus as defined in claim 1, further comprising, in combination, an additional thyratron-like switching element, and means for separately connecting the additional switching element is parallel with the switching elements in the respective branches of the inverter.

9. The apparatus as defined in claim 8 in which the connecting means comprises a pair of series-aiding diodes individually associated with each branch.

10. The apparatus as defined in claim 1, further comprising means individually disposed in each of the branches for detecting the current in the associated branch.

11. The apparatus as defined in claim 10, in which each detecting means comprises an auxiliary coil magnetically coupled to the main coil in the associated branch.

12. The apparatus as defined in claim 10, further comprising comparator means responsive to the detecting means for selectively switching the impulse supply means from the first mode to the second mode when an overload current condition is present in one of the inverter branches.

13. The apparatus as defined in claim 12, further comprises means coupled to the comparator means for providing a unique indication of the branch in which an overload current condition is present.

* * * * *